United States Patent [19]
Bedell, Jr. et al.

[11] Patent Number: 5,923,019
[45] Date of Patent: Jul. 13, 1999

[54] FIXED HEAD MAGNETIC STRIPE READER-ENCODER

[75] Inventors: Edwin A. Bedell, Jr., Danville; Terry W. Schindler, Sunbury, both of Pa.

[73] Assignee: ELK Technologies, Inc., Sunbury, Pa.

[21] Appl. No.: 08/872,024

[22] Filed: Jun. 10, 1997

[51] Int. Cl.⁶ .............................. G06K 7/08; G06K 13/06; G06K 13/00; G06K 7/00
[52] U.S. Cl. .......................... 235/449; 235/486; 235/493
[58] Field of Search ..................................... 235/449, 483, 235/482, 486, 493, 495

[56] References Cited

U.S. PATENT DOCUMENTS

| | | | |
|---|---|---|---|
| 3,947,663 | 3/1976 | De Sandre et al. | 235/61.11 |
| 4,254,441 | 3/1981 | Fisher | 360/88 |
| 4,798,942 | 1/1989 | Aubrey | 235/384 |
| 5,101,097 | 3/1992 | Conant | 235/449 |
| 5,308,959 | 5/1994 | Cherry | 235/379 |
| 5,331,139 | 7/1994 | Lee | 235/449 |
| 5,345,090 | 9/1994 | Hludzinski | 250/566 |
| 5,393,966 | 2/1995 | Gatto et al. | 235/440 |
| 5,438,186 | 8/1995 | Nair et al. | 235/449 |
| 5,569,898 | 10/1996 | Fisher et al. | 235/448 |
| 5,714,747 | 2/1998 | West et al. | 235/493 |

*Primary Examiner*—Donald Hajec
*Assistant Examiner*—Daniel Sherr
*Attorney, Agent, or Firm*—Buchanan Ingersoll, P.C.

[57] ABSTRACT

A magnetic transducer assembly having no moving parts for detecting and reading information stored on a magnetic stripe on the back of a card. The assembly has a base member with electrical connectors, a card guide member with an S-shaped channel therein to guide a card through the assembly, and a magnetic detection head fixed in a cavity provided in the card guide member on an upper side of the S-shaped channel and at a junction of the convex entry passageway and the concave exit passageway of the S-shaped channel. The fixed magnetic head has a convex face protruding from the cavity and into the S-shaped channel at the junction so that the magnetic stripe on the back of a card inserted through the S-shaped channel frictionally engages the magnetic head so that the magnetic head may read information encoded on the magnetic stripe. The fixed magnetic head is preferably rotated away from the direction which the card travels through the s-shaped channel. Additionally, the S-shaped channel is preferably sufficiently deep so that the card is firmly held within the channel as it travels through the card guide member.

4 Claims, 3 Drawing Sheets

FIXED HEAD MAGNETIC STRIPE READER-ENCODER

FIELD OF THE INVENTION

The invention relates to devices for reading information stored on a magnetic stripe provided on the back of a credit card, toll card, membership card, and the like. More particularly, the device relates to a magnetic stripe reader having a fixed magnetic head for scanning the information on the magnetic stripe.

BACKGROUND OF THE INVENTION

Credit cards have gained widespread use in recent years and have come to be generally regarded as a third type of currency. Credit cards are widely used in place of cash and checks probably because people don't like to carry large amounts of cash and personal checks are not widely accepted, especially in other states and foreign countries. As a result, magnetic recordation of digital information on credit cards has increased enormously in recent years. Moreover, as the use of credit cards has proliferated, the use of magnetic stripes on the back of cards has been expanded to include other types of cards. For example, toll cards, membership cards, and pass cards for gaining admittance to homes, offices, garages and the like now commonly employ the technology of encoding information on a magnetic stripe on the back of the cards.

With the increased use of magnetic stripe encoded cards there has been a substantial increase in the demand for better devices which read such magnetically recorded information on the magnetic stripe. The demand is particularly high in the retail and banking establishments.

In order to effect a reading of the magnetic stripe on the card, the card must be moved through a device having a magnetic reader head, which engages the magnetic stripe on the back of the card. There two common types of such devices are "sweep" types and "insertion" types. The "sweep" type requires the user to "sweep" the edge of the card bearing the magnetic stripe thereon through a channel in which the magnetic head is positioned. The "insertion" type requires the user to push then pull the card into a slot, through which the card is read or encoded while pushing or pulling the card. The contact between the magnetic stripe and the magnetic head is of utmost importance in accurately reading the information on the magnetic stripe. Thus, it is essential to create and maintain smooth, constant engagement between the magnetic stripe and the magnetic head.

One of the primary problems with contemporary magnetic stripe reading devices is something referred to as "jitter." Jitter is the term used to describe the phenomenon that occurs when the magnetic head vibrates. Vibration primarily occurs when the card is initially inserted into the card reader slot, but can also occur while the card is being passed through the slot if the magnetic stripe is not maintained firmly against the magnetic head. Generally, ANSI standards allow for up to 10% bit to bit jitter as being an acceptable level from unused encoded cards. However, although not specified in any standard, the lowest possible percentage of bit to bit jitter added by reading devices used in the field will insure optimum efficiency exemplified by error free reading to the end user.

Another problem with contemporary magnetic stripe reading devices is that of mechanically coping with deformed or warped cards. In order to obtain an accurate reading of the magnetic stripe, it is necessary to maintain the magnetic stripe against the magnetic head of the reading device during the transport of the card through the card reader slot. When the card is not relatively flat it can be a difficult task to keep the magnetic head in contact with the magnetic stripe.

The conventional approach to coping with deformed or warped cards has been to provide spring loaded magnetic heads in which the spring urges the magnetic head against the magnetic stripe. Although this approach has been successful to some extent, it does not address the problem of jitter. In fact, designs which utilize spring loaded magnetic heads, the spring can actually increase the problem with jitter. The flexible nature of the spring permits the magnetic head to vibrate initially upon card entry to the extent that reader induced bit to bit jitter above 10% is common. Jitter readings are frequently inconsistent in spring designs. Furthermore, the use of a spring loaded magnetic head can create the additional problem of unevenly wearing the magnetic stripe on the back of the card. Spring devices align the read head to the form of the card or ticket as it is inserted. During alignment, forces are exerted where the head initially contacts the magnetic stripe which can damage the media at point of contact. This invention eliminates spring alignment induced damage by forming the card into a flattened form, as it is brought into contact with the magnetic head, which causes the magnetic stripe to properly engage the magnetic head without damaging the media.

In U. S. Pat. No. 4,254,441 to Fisher, a digital code reader is provided which has a fixed magnetic head. The fixed magnetic head is provided with the objectives of increasing both the reliability and the life span of the device compared to devices which utilize a spring biased magnetic heads. In FIG. 7 of Fisher, the pathway through which the card travels and the position of the magnetic head reveal the potential for a significant amount of jitter. When a card is inserted through the entrance passage, i.e. from the left hand side of the device, it can be seen that the leading edge of the card is almost certain to strike the magnetic head. This contact between the edge of the card and the magnetic head is very likely to cause substantial vibrations resulting in jitter.

Therefore, there is a need for a magnetic stripe reading device that alleviates problems with contemporary devices, provides for improved contact between the magnetic stripe and the magnetic head, and also satisfies the need to reduce the jitter.

SUMMARY OF THE INVENTION

According to the present invention an apparatus for reading information on a magnetic stripe on the back of a card is provided. The magnetic stripe reader having features of the present invention can be a "sweep" type device having a base member, a card guide member, an S-shaped channel provided through the card guide member, and a magnetic head fixed in a cavity provided in the card guide member on one side of the S-shaped channel. The fixed magnetic head has a convex face, the apex of which protrudes into the S-shaped channel and is engaged the magnetic stripe on the back of a card in order to read information stored thereon. The apparatus further has electrical wires extending through the base member for connecting the device to a host processor. As such, the apparatus has no moving parts. The magnetic head is fixed in position in communication with the S-shaped channel so that contact between the magnetic head and the magnetic stripe on the back of a card is caused by the spring force of the card as it passes through the curved path formed by the S-shaped channel. Furthermore, the fixed magnetic head is preferably rotated at a slight angle, pointing away from the direction of the entry path of the card.

The curved surfaces formed by the S-shaped channel provide improved contact between the magnetic head and the magnetic stripe even if the card is bent or warped. Also, the curved surfaces guide the card through the S-shaped channel and into the contact with the fixed magnetic head while preventing the leading edge of the card from striking the magnetic head, which can result in vibration induced jitter. Additionally, the card guide member and the S-shaped channel are provided with sufficient depth so that the card is firmly held and guided along the entire length of the S-shaped channel in a controlled manner to prevent vibration induced jitter.

Since there are no moving parts, the magnetic stripe reader can be made impervious to harsh environments encountered by such readers when installed out of doors, even to the extent that some versions can be waterproof. Additionally, the absence of moving parts increases the functional life of the device which becomes subject to only the wear on the magnetic head. Furthermore, the fixed magnetic head design eliminates the springs and spring mounting accessories which can reduce design and manufacturing costs. Another benefit of the fixed magnetic head is that the head can be more resistant to damage from improper insertion of a card into the reader.

Other details, objects and advantages of the invention will become apparent from the following description of the accompanying drawings of certain embodiments thereof.

BRIEF DESCRIPTION OF THE DRAWING FIGURES

In the accompanying drawing figures, certain preferred embodiments of the invention are illustrated in which.

DETAILED DESCRIPTION OF CERTAIN EMBODIMENTS

Figure 1:
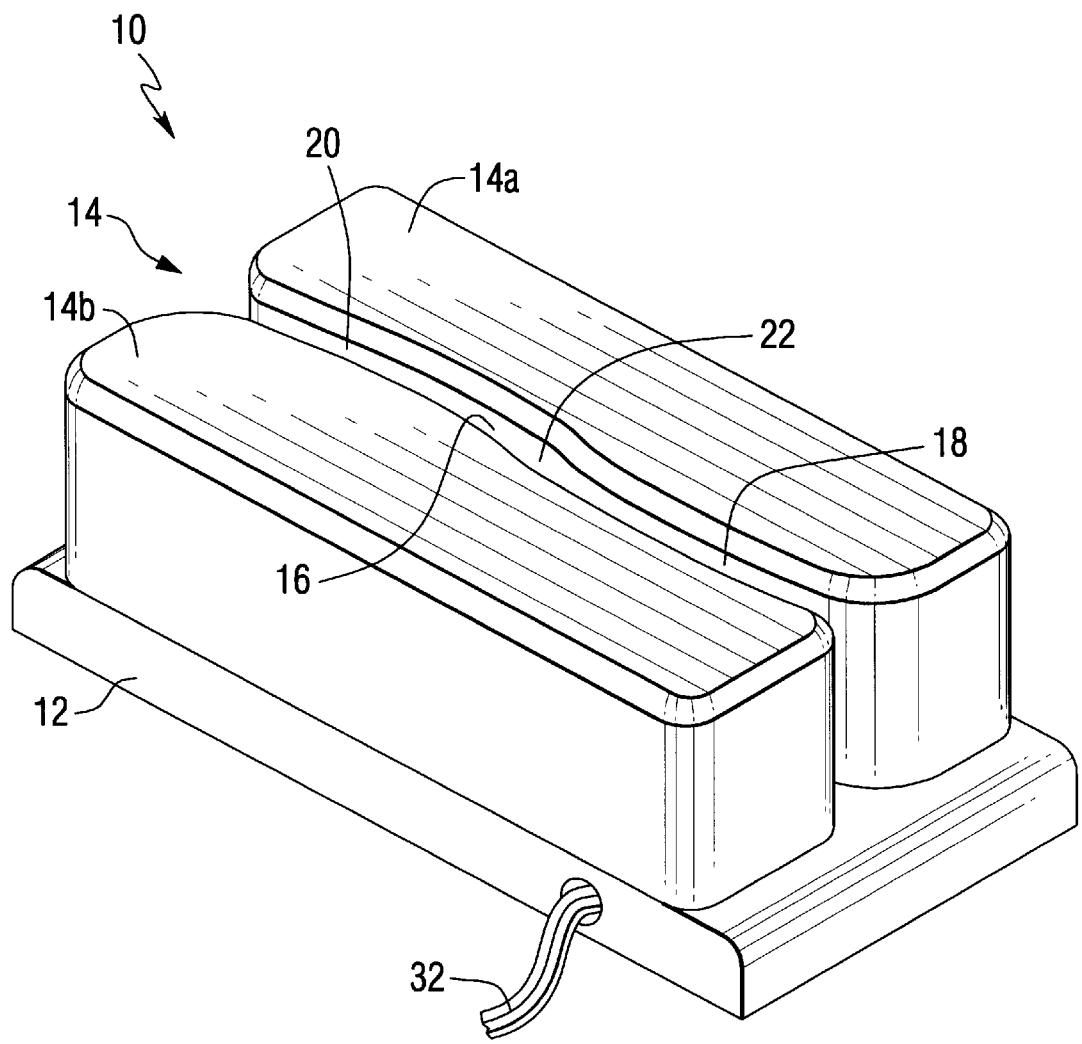
FIG. 1 is a perspective view of an embodiment of the invention.
Figure 2:
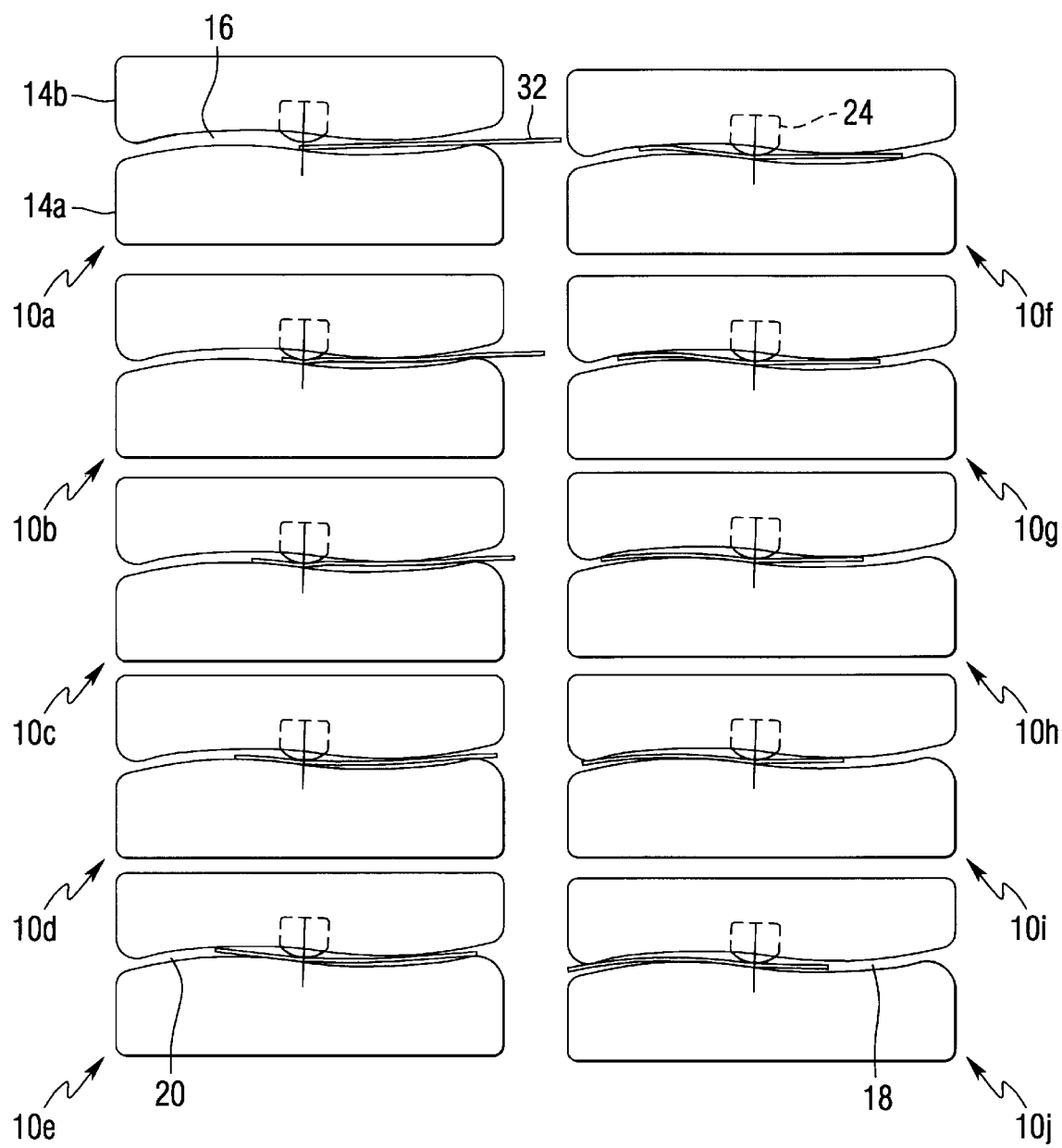
FIG. 2 is a series of top views of an embodiment of the invention illustrating the progress of a card as it travels through the S-shaped channel.
Figure 3:
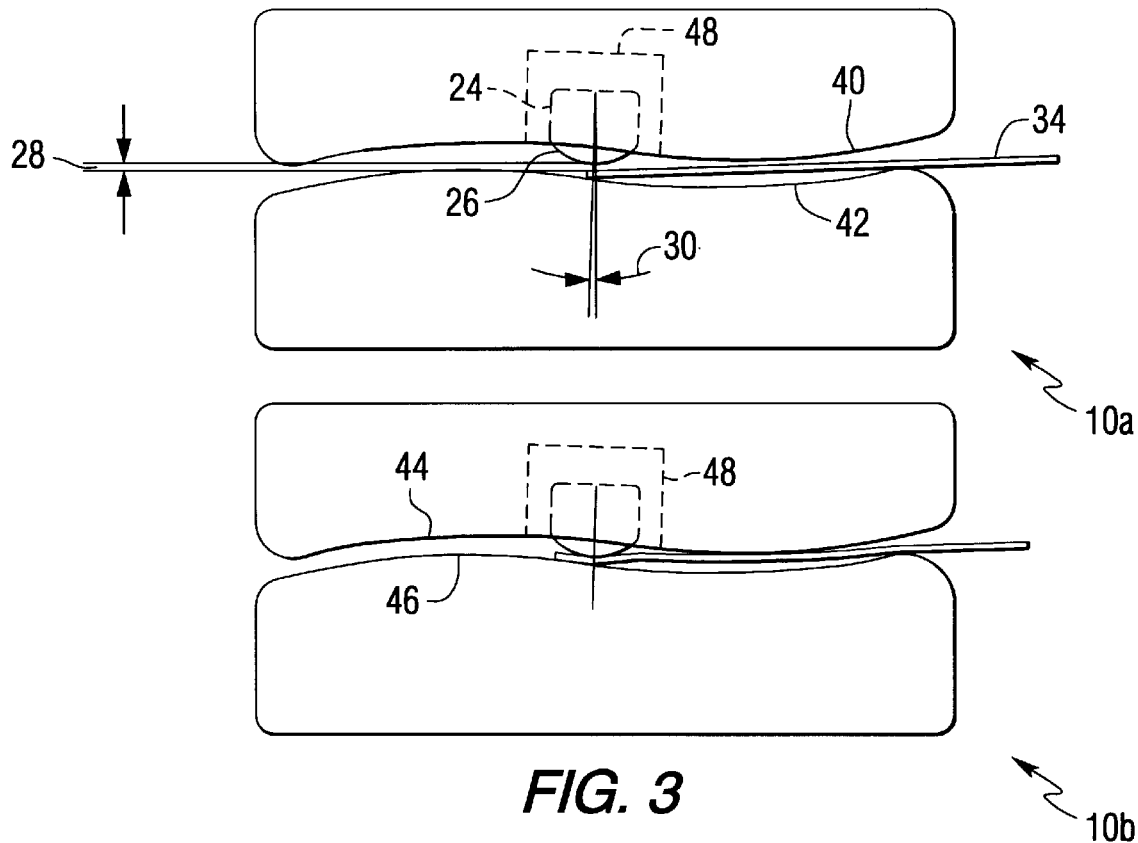
FIG. 3 is a close-up view of the first two sequences illustrated in FIG. 2.
Figure 4:
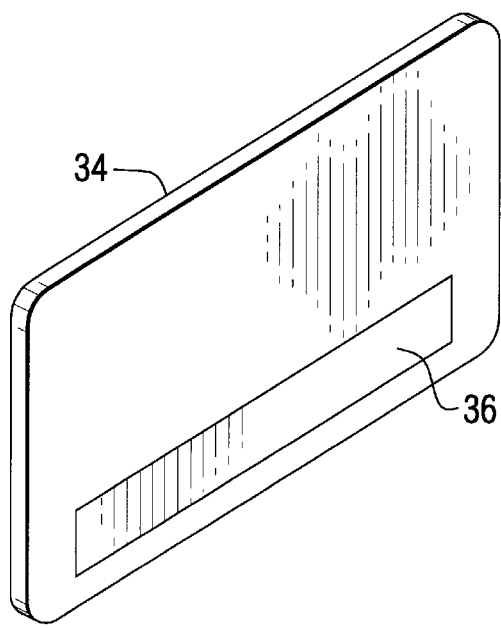
FIG. 4 is a perspective view of a typical card having a magnetic strip on the back.

Referring now to the drawing figures wherein like reference numbers refer to similar parts throughout the several views, an apparatus having features of the present invention for reading information encoded on a magnetic stripe provided on the back of a card is shown in FIGS. 1–3.

A magnetic stripe reading device 10 has a base member 12 connected to a guide member 14, an S-shaped channel 16 through the guide member 14, a magnetic head 24 fixed in a cavity 48 provided on one side of the S-shaped channel 16, and electrical wiring 32 for connecting the magnetic stripe reader 10 to a processor.

The S-shaped channel 16 defines, with respect to the fixed magnetic head 24, a concave entry passageway 18 and a convex exit passageway 20 and divides the card guide member 14 into first and second portions, 14a and 14b, respectively.

A card having thereon an encoded magnetic stripe to be read by the reading device 10 is inserted through the entry passageway 18 and is engaged by an upper convex bearing surface 40 and an opposing lower concave bearing surface 42 which guide the card firmly through the entry passageway 18. The bearing surfaces 40 and 42 guide the card such that the leading edge of the card passes over the magnetic head 24 without hitting the convex face 26 prior to the convex bearing surface 46 of the exit passageway 20 causing the card to bend and frictionally engage the magnetic head 24. The path of the card is illustrated by successive sequences 10a–10j, as shown in FIG. 2, and also in the close-up view of the first two sequences, 10a and 10b, as shown in FIG. 3.

The magnetic head 24 is fixed in a cavity 48 provided in the upper portion 14a of the card guide member 14 at the junction 22 of the entry passage way 18 and the exit passage way 20, as shown in FIG. 3. The convex face 26 of the magnetic head 24 protrudes into the S-shaped channel 16 at the junction 22 so that as the card travels through the S-shaped channel 16, the magnetic stripe on the back of the card will frictionally engage the convex face 26 of the magnetic head 24. The magnetic head 24 is fixed in the card guide member 14 preferably in a rotated position such that the apex of the convex face is facing a certain number of degrees away from the direction that the card travels through the card guide member 14, as shown in FIG. 3. The rotation is can be provided so that a centerline through the apex of the convex face will be generally normal to the plane of the magnetic stripe on the back of the card when the card is bent and the magnetic stripe frictionally engages the magnetic head 24. Preferably, the magnetic head 24 is rotated about 5 degrees clockwise from normal.

The width of the S-shaped channel 16 and the radii of the entry passageway 18 and the exit passageway 20 are designed such that there is a gap 28 between the leading edge of the card and the magnetic head 24 as the leading edge of the card reaches the apex of the convex face 26, as shown in sequence 10a of FIG. 3. As the leading edge of the card passes over the magnetic head 24, it is engaged by the convex exit passageway 20 which forces the card to bend thereby causing the magnetic stripe on the back of the card to frictionally engage the convex face 26 of the magnetic head 24, as shown in sequence 10b of FIG. 3. In this manner, the card can be guided through the S-shaped channel 16 and into frictional engagement with the magnetic head 24 while preventing the leading edge of the card from striking the magnetic head 24 and can thereby avoid jitter which could be caused by the resulting vibrations.

Additionally, the fixed head can be more resistant to being damaged by an improperly inserted card. One test, called the "hatchet test," which is frequently performed on card reading devices, involves inserting a card into the slot directly from the side such that the edge of the card strikes the side of the magnetic head. Results of this test has shown that a fixed magnetic head is more impervious to damage than a floating magnetic head. Also, the S-shaped channel is a deterrent to inserting cards improperly from the side since the straight edge of the card cannot be readily inserted into the S-shaped channel.

The term "card" has been used herein to describe the object which is guided through the device 10. It is to be distinctly understood that the term "card" encompasses cards made of plastic, paper, and other materials.

The S-shaped channel 16 is provided with sufficient depth so that the card is held firmly therein as it travels the entire length of the card guide member 14. The deep S-shaped channel 16, which can be about one half the width of the card 34, holds the card firmly to reduce vibration which could cause jitter.

While specific embodiments of the invention have been described in detail, it will be appreciated by those skilled in the art that various modifications to those details could be developed in light of the overall teachings of the disclosure. For example, it is to be understood that a magnetic stripe encoding device utilizing an S-shaped channel could be fashioned employing the teachings disclosed herein by the addition of the requisite magnetic stripe encoding components which are well-known to those skilled in the art.

Accordingly, the particular embodiments disclosed herein are intended to be illustrative only and not limiting to the scope of the invention which should be awarded the full breadth of the following claims and any and all embodiments thereof.

What is claimed is:

1. A magnetic transducer assembly having no moving parts for detecting and reading magnetically encoded information on a magnetic stripe provided on a card as such card is passed through the assembly, said assembly comprising:

a. a base member having electrical connectors for attaching the assembly to a processor;

b. a card guide member having an S-shaped channel therein to guide the card through the assembly, said S-shaped channel defining a curved entry passageway and a curved exit passageway, said entry passageway having a convex bearing surface and an opposing concave bearing surface;

c. a fixed magnetic detection head having a generally convex face, said magnetic head rigidly mounted in a cavity provided in the card guide member on one side of the S-shaped channel at a junction of the curved entry passageway and the curved exit passageway, said curved entry passageway being concave with respect to said fixed magnetic head, said curved exit passageway being convex with respect to said fixed magnetic head, said generally convex face protruding from said cavity into said S-shaped channel at said junction so that an apex of said generally convex face is frictionally engaged by the magnetic stripe on the back of a card which is inserted through the S-shaped channel so that said magnetic detection head detects and reads the information encoded in the magnetic stripe; and d. said convex bearing surface and opposing concave bearing surface firmly guiding the card through the entry passageway and causing a leading edge of the card to be guided over and beyond the convex face of the magnetic head prior to the card being forced to bend causing the magnetic stripe on the back of the card to frictionally engage the magnetic head, whereby the leading edge of the card is prevented from striking the magnetic head.

2. The magnetic stripe reader of claim 1 wherein the fixed magnetic head is rotated away from the direction which the card travels through the S-shaped channel so that a centerline through the apex of the convex face is generally normal to the plane of the magnetic stripe on the back of the card when the card is bent and the magnetic stripe frictionally engages the magnetic head.

3. The magnetic stripe reader of claim 1 wherein said magnetic head is rotated about 5 degrees away from the direction which the card travels through the S-shaped channel.

4. The magnetic stripe reader of claim 1 wherein the S-shaped channel has a depth of about one half the width of a standard sized credit card.

* * * * *